(12) United States Patent
Deichmann et al.

(10) Patent No.: US 12,543,639 B2
(45) Date of Patent: Feb. 10, 2026

(54) TENSION PLATE FOR AN ARM OF AN AGRICULTURAL HEADER

(71) Applicant: CNH Industrial America LLC, New Holland, PA (US)

(72) Inventors: Scott P. Deichmann, Phoenixville, PA (US); Benjamin D. Kemmerer, Hamburg, PA (US); Joel T. Cook, Akron, PA (US); Luke W. Morrie, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 543 days.

(21) Appl. No.: 18/015,654

(22) PCT Filed: Jul. 21, 2021

(86) PCT No.: PCT/US2021/042547
§ 371 (c)(1),
(2) Date: Jan. 11, 2023

(87) PCT Pub. No.: WO2022/020451
PCT Pub. Date: Jan. 27, 2022

(65) Prior Publication Data
US 2023/0247937 A1  Aug. 10, 2023

Related U.S. Application Data

(60) Provisional application No. 63/054,614, filed on Jul. 21, 2020.

(51) Int. Cl.
*A01D 34/04* (2006.01)
*A01D 34/28* (2006.01)
*A01D 34/40* (2006.01)

(52) U.S. Cl.
CPC .......... *A01D 34/283* (2013.01); *A01D 34/04* (2013.01); *A01D 34/40* (2013.01)

(58) Field of Classification Search
CPC .. A01D 61/002; A01D 61/004; A01D 61/006; A01D 34/13; A01D 34/135;
(Continued)

(56) References Cited

U.S. PATENT DOCUMENTS 2,850,937 A * 9/1958 Ralston ................... E21D 21/02
  405/259.1
4,149,446 A * 4/1979 Spengler ............... F16B 31/028
  411/11

(Continued)

FOREIGN PATENT DOCUMENTS

CA     3125480 A1     7/2020
DE  102012108835 A1 * 3/2014  ............. A01D 41/14
(Continued)

OTHER PUBLICATIONS

International Search Report and Written Opinion for PCT Application No. PCT/US2021/042547 dated Oct. 29, 2021 (13 pages).

*Primary Examiner* — Adam J Behrens
(74) *Attorney, Agent, or Firm* — Buchanan Ingersoll & Rooney PC

(57) ABSTRACT

An arm assembly for an agricultural header includes an arm configured to rotate about a pivot axis relative to a frame of the agricultural header and configured to support a cutter bar assembly of the agricultural header. The arm assembly also includes a mounting bracket assembly configured to couple the arm to the frame, one or more fasteners configured to couple the arm to the mounting bracket assembly, and a plate configured to maintain a tension of the one or more fasteners with respect to the arm and the mounting bracket assembly.

16 Claims, 8 Drawing Sheets

(58) Field of Classification Search
CPC .... A01D 34/24; A01D 34/243; A01D 34/246; A01D 34/28; A01D 34/286; A01D 34/04; A01D 34/283; A01D 34/40; A01D 41/14
See application file for complete search history.

(56) References Cited

U.S. PATENT DOCUMENTS

| | | | |
|---|---|---|---|
| 4,332,126 | A | 6/1982 | Van Auwelaer et al. |
| 4,573,308 | A * | 3/1986 | Ehrecke ............... A01D 41/14 56/15.8 |
| 4,599,852 | A * | 7/1986 | Kerber ............... A01D 41/14 56/15.8 |
| 8,601,779 | B1 * | 12/2013 | Figgins ............... A01D 34/283 56/181 |
| 9,402,343 | B1 * | 8/2016 | Allochis ............... A01D 34/283 |
| 10,299,437 | B2 * | 5/2019 | Farley ............... A01D 34/04 |
| 10,462,968 | B2 * | 11/2019 | Shearer ............... A01D 41/141 |
| 2010/0083629 | A1 * | 4/2010 | Klotzbach ............... A01D 41/14 56/320.1 |
| 2022/0030767 | A1 * | 2/2022 | Cook ............... A01D 34/283 |

FOREIGN PATENT DOCUMENTS

| | | |
|---|---|---|
| WO | 2020/101841 A1 | 5/2020 |
| WO | 2020/101860 A1 | 5/2020 |
| WO | 2020/131226 A1 | 6/2020 |

* cited by examiner

TENSION PLATE FOR AN ARM OF AN AGRICULTURAL HEADER

BACKGROUND

The present disclosure relates generally to a tension plate for an arm of an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain agricultural crops that include grain (e.g., barley, corn, flax, oats, rye, wheat). During operation of the harvester, the harvesting process may begin by removing a plant from a field, such as by using a header. The header may cut the agricultural crops and transport the cut agricultural crops to a processing system of the harvester. The header may include a cutter bar assembly configured to cut a portion of each agricultural crop (e.g., a stalk), thereby separating the cut agricultural crop from the soil. The cutter bar assembly may extend along a substantial portion of a width of the header at a forward end of the header.

BRIEF DESCRIPTION

In one embodiment, an arm assembly for an agricultural header includes an arm configured to rotate about a pivot axis relative to a frame of the agricultural header and configured to support a cutter bar assembly of the agricultural header. The arm assembly also includes a mounting bracket assembly configured to couple the arm to the frame, one or more fasteners configured to couple the arm to the mounting bracket assembly, and a plate configured to maintain a tension of the one or more fasteners with respect to the arm and the mounting bracket assembly.

In one embodiment, an agricultural header includes a frame, an arm configured to rotate about a pivot axis relative to the frame, one or more fasteners configured to couple the arm to the frame, and a plate configured to flex to maintain a tension of the one or more fasteners with respect to the arm and the frame.

In one embodiment, an arm assembly for an agricultural header includes an arm configured to rotate about a pivot axis relative to a frame of the agricultural header and configured to support a cutter bar assembly of the agricultural header. The arm assembly also includes one or more fasteners configured to couple the arm to a mounting bracket assembly of the agricultural header and a plate configured to maintain a tension of the one or more fasteners with respect to the arm and the mounting bracket assembly.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
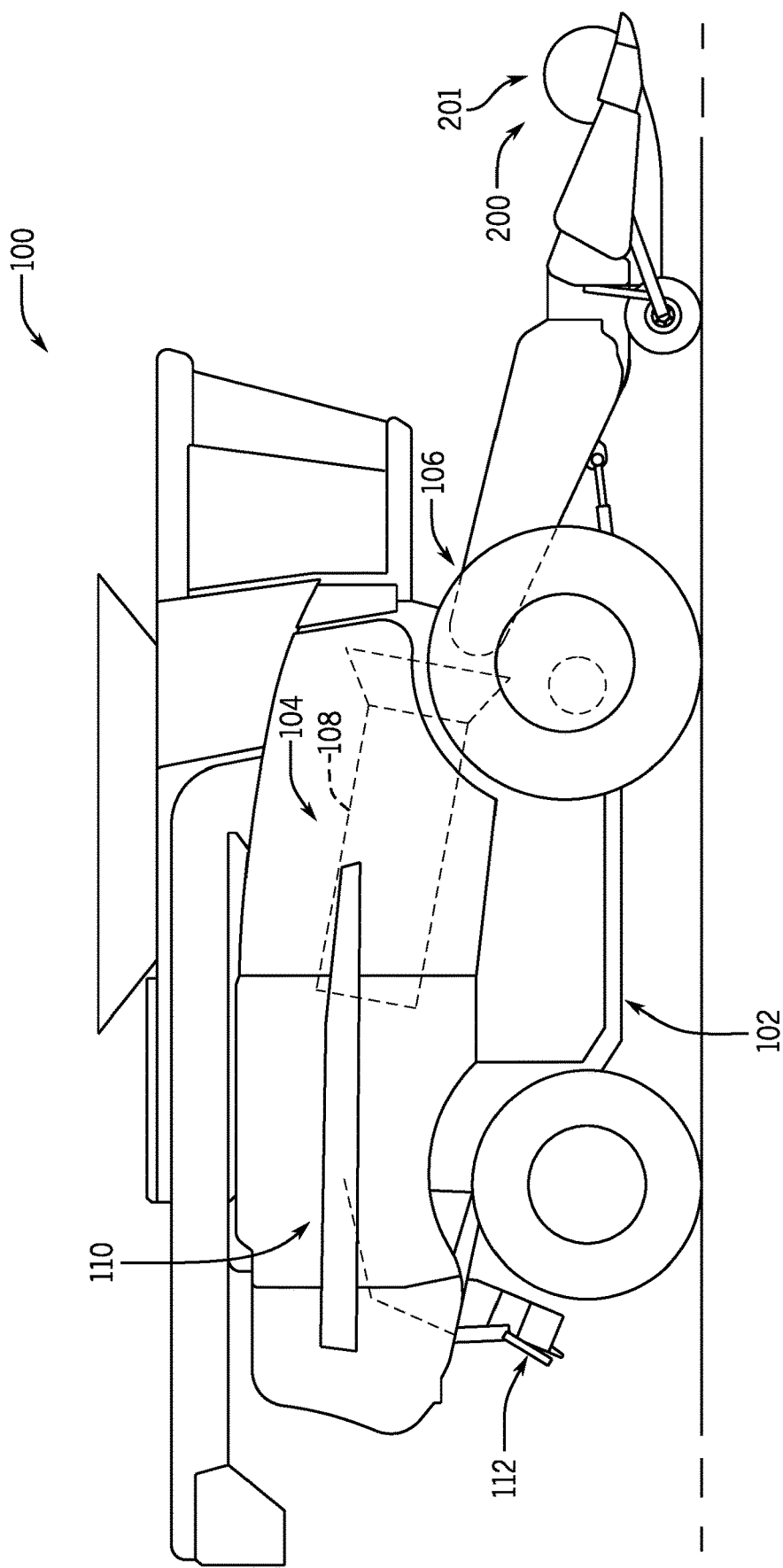
FIG. 1 is a side view of an embodiment of an agricultural harvester having a header, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

An agricultural harvester may include a header having a cutter bar assembly. The cutter bar assembly may include a cutter bar, a stationary blade assembly, and a moving blade assembly. The moving blade assembly may be fixed to the cutter bar, and the cutter bar/moving blade assembly may be driven to oscillate relative to the stationary blade assembly. Each blade assembly may include multiple blades distributed along a width of the respective blade assembly. As the moving blade assembly is driven to oscillate, the blades of the moving blade assembly move relative to the blades of the stationary blade assembly. As the header is moved through the field by the agricultural harvester, a portion of a crop (e.g., the stalk) may enter a gap between adjacent blades of the stationary blade assembly and a gap between adjacent blades of the moving blade assembly. Movement of the moving blade assembly causes a blade of the moving blade assembly to move across the gap in the stationary blade assembly, thereby cutting the portion of the crop. The header may include belts that move the cut crops toward an inlet of the agricultural crop processing system. In some embodiments, the header may include a reel assembly that directs the cut crops from the cutter bar assembly toward the belts.

The cutter bar assembly may be flexible along a width of the header. In such cases, the cutter bar assembly may be supported by multiple longitudinally-extending arms distributed along the width of the header. Each arm may be pivotally mounted to a frame of the header, thereby enabling the cutter bar assembly to flex during operation of the harvester. While the flexible cutter bar assembly is in contact with the soil surface, the flexible cutter bar assembly may follow the contours of the field, thereby enabling a cutting height to be substantially constant along the width of the header. If a greater cutting height is desired (e.g., based on the field conditions, the types of crops being harvested), the header may be raised such that the flexible cutter bar assembly is positioned above the soil surface. In addition, if a substantially rigid cutter bar is desired (e.g., for certain field conditions, for harvesting certain types of crops), the pivoting movement of each arm may be blocked, thereby substantially reducing the flexibility of the cutter bar assembly. It is now recognized that as the arms pivot relative to the frame of the header, fasteners coupling the arms to the frame may stretch, such that the arms become loose. Additionally, loads on the arms at ends coupled to the cutter bar assembly may cause stretching of the fasteners coupling opposite ends of the arms to the frame. Such loads on the arms may be caused by contact of the cutter bar assembly and/or other portions of the header with obstacles, such as a fence, a dirt mound (e.g., the cutter bar assembly scooping dirt from the soil surface), and other foreign objects. The loose coupling of the arms to the frame may inhibit flexing of the cutter bar assembly and performance of the header generally.

Turning to the drawings, FIG. 1 is a side view of an embodiment of an agricultural harvester 100 having a header 200 (e.g., agricultural header). The agricultural harvester 100 includes a chassis 102 configured to support the header 200 and an agricultural crop processing system 104. As described in greater detail below, the header 200 is configured to cut crops and to transport the cut crops toward an inlet 106 of the agricultural crop processing system 104 for further processing of the cut crops. For example, the header 200 includes a reel assembly 201 configured to direct cut crops toward belts that convey the crops toward an inlet of the agricultural crop processing system 104. In certain embodiments, the reel assembly 201 may be omitted. The agricultural crop processing system 104 receives the cut crops from the header 200 and separates desired crop material (e.g., grain) from crop residue (e.g., husks and pods). For example, the agricultural crop processing system 104 may include a thresher 108 having a cylindrical threshing rotor that transports the cut crops in a helical flow path through the agricultural harvester 100. In addition to transporting the cut crops, the thresher 108 may separate the desired crop material from the crop residue and may enable the desired crop material to flow into a cleaning system located beneath the thresher 108. The cleaning system may remove debris from the desired crop material and transport the desired crop material to a storage compartment within the agricultural harvester 100. The crop residue may be transported from the thresher 108 to a crop residue handling system 110, which may remove the crop residue from the agricultural harvester 100 via a crop residue spreading system 112 positioned at the aft end of the agricultural harvester 100.

As discussed in detail below, the header 200 includes a cutter bar assembly configured to cut the crops within the field. The cutter bar assembly is configured to flex along a width of the header to enable the cutter bar assembly to substantially follow the contours of the field while the cutter bar assembly is engaged with the soil surface. The cutter bar assembly is supported by multiple longitudinally extending arm assemblies distributed along the width of the header. Each arm assembly is pivotally mounted to a frame of the header, thereby enabling the cutter bar assembly to flex. If a substantially rigid cutter bar is desired (e.g., for certain field conditions, for harvesting certain types of crops), the pivoting movement of each arm may be blocked, thereby substantially reducing the flexibility of the cutter bar assembly.

Each arm assembly may include an arm coupled to the cutter bar assembly, a mounting bracket assembly coupled to the arm and to the frame of the agricultural header, fasteners that couple the arm to the mounting bracket assembly, and a plate (e.g., a tension plate) disposed generally between the fasteners (e.g., heads of the fasteners) and the arm. For example, a first end of the arm coupled to the mounting bracket assembly may be biased upwardly while a second end of the arm coupled to the cutter bar assembly is biased downwardly due to a weight of the cutter bar assembly and/or agricultural product, dirt, and other materials being disposed on and adjacent to the cutter bar assembly. As the arm assembly rotates relative to the frame, the first end of the arm coupled to the mounting bracket assembly may experience forces, such that the fasteners coupling the first end of the arm to the mounting bracket assembly stretch. Accordingly, the plate disposed between the fasteners and the arm may maintain a tensioned coupling between the arm and the mounting bracket assembly. For example, the plate may maintain contact with both a surface of the arm and heads of the fasteners (e.g., the stretched fasteners) to maintain a substantially rigid coupling between the arm and the mounting bracket assembly. Doing so enables the arm assembly to remain substantially rigid without breaking (e.g., without the fasteners breaking), thereby enabling the cutter bar assembly to flex.

Figure 2:
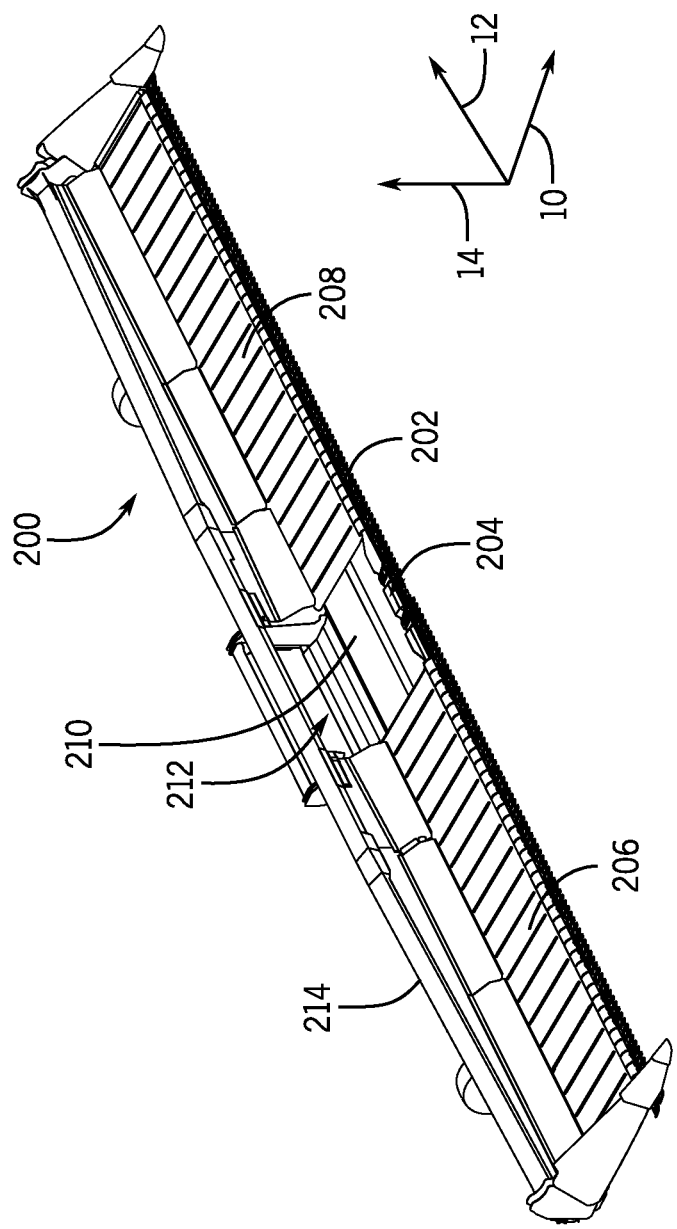
FIG. 2 is a perspective view of an embodiment of a header that may be employed within the agricultural harvester of FIG. 1, in accordance with an aspect of the present disclosure.

FIG. 2 is a perspective view of an embodiment of the header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200 and relative to a direction of travel of the header 200 during harvesting operations. As illustrated, the cutter bar assembly 202 extends along a substantial portion of the width of the header 200 (e.g., the extent of the header 200 along a lateral axis 12). The cutter bar assembly includes a cutter bar, a stationary blade assembly, and a moving blade assembly. The moving blade assembly is fixed to the cutter bar (e.g., above the cutter bar relative to a vertical axis 14 of the header 200), and the cutter bar/moving blade assembly is driven to oscillate relative to the stationary blade assembly. In the illustrated embodiment, the cutter bar/moving blade assembly is driven to oscillate by a driving mechanism 204 positioned at the lateral center of the header 200. However, in other embodiments, the cutter bar/moving blade assembly may be driven by another suitable mechanism (e.g., located at any suitable position on the header). As the agricultural harvester is driven through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side of the header 200 and a second lateral belt 208 on a second lateral side of the header 200, opposite the first lateral side. Each belt is driven to rotate by a suitable drive mechanism, such as an electric motor or a hydraulic motor. The first lateral belt 206 and the second lateral belt 208 are driven such that the top surface of each belt moves laterally inward. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. The longitudinal belt 210 is driven such that the top surface of the longitudinal belt 210 moves rearwardly along the longitudinal axis 10. In certain embodiments, the crops cut by the cutter bar assembly 202 are directed toward the belts by a reel assembly. Agricultural crops that contact the top surface of the lateral belts 206, 208 are driven laterally inwardly to the longitudinal belt 210 due to the movement of the lateral belts 206, 208. In addition, agricultural crops that contact the longitudinal belt 210 and the agricultural crops provided to the longitudinal belt 210 by the lateral belts 206, 208 are driven rearwardly along the longitudinal axis 10 due to the movement of the longitudinal belt 210. Accordingly, the belts move the cut agricultural crops through an opening 212 in the header 200 to the inlet of the agricultural crop processing system.

In the illustrated embodiment, the cutter bar assembly 202 is flexible along the width of the header 200 (e.g., the extent of the header 200 along the lateral axis 12). As discussed in detail below, the cutter bar assembly 202 is supported by multiple arm assemblies extending along the longitudinal axis 10 and distributed along the width of the header 200 (e.g., along the lateral axis 12 of the header 200). Each arm assembly is mounted to a frame 214 of the header 200 and configured to rotate about a pivot axis relative to the frame. As a result, the cutter bar assembly 202 may flex during operation of the harvester. The flexible cutter bar assembly 202 may follow the contours of the field while the cutter bar assembly 202 is in contact with the surface of the field, thereby enabling the cutting height (e.g., the height at which each crop is cut) to be substantially constant along the width of the header 200 (e.g., the extent of the header 200 along the lateral axis 12). However, if a substantially rigid cutter bar assembly is desired (e.g., for certain field conditions, for harvesting certain types of crops), the pivoting movement of the arm assemblies may be blocked, thereby substantially reducing the flexibility of the cutter bar assembly 202.

Figure 3:
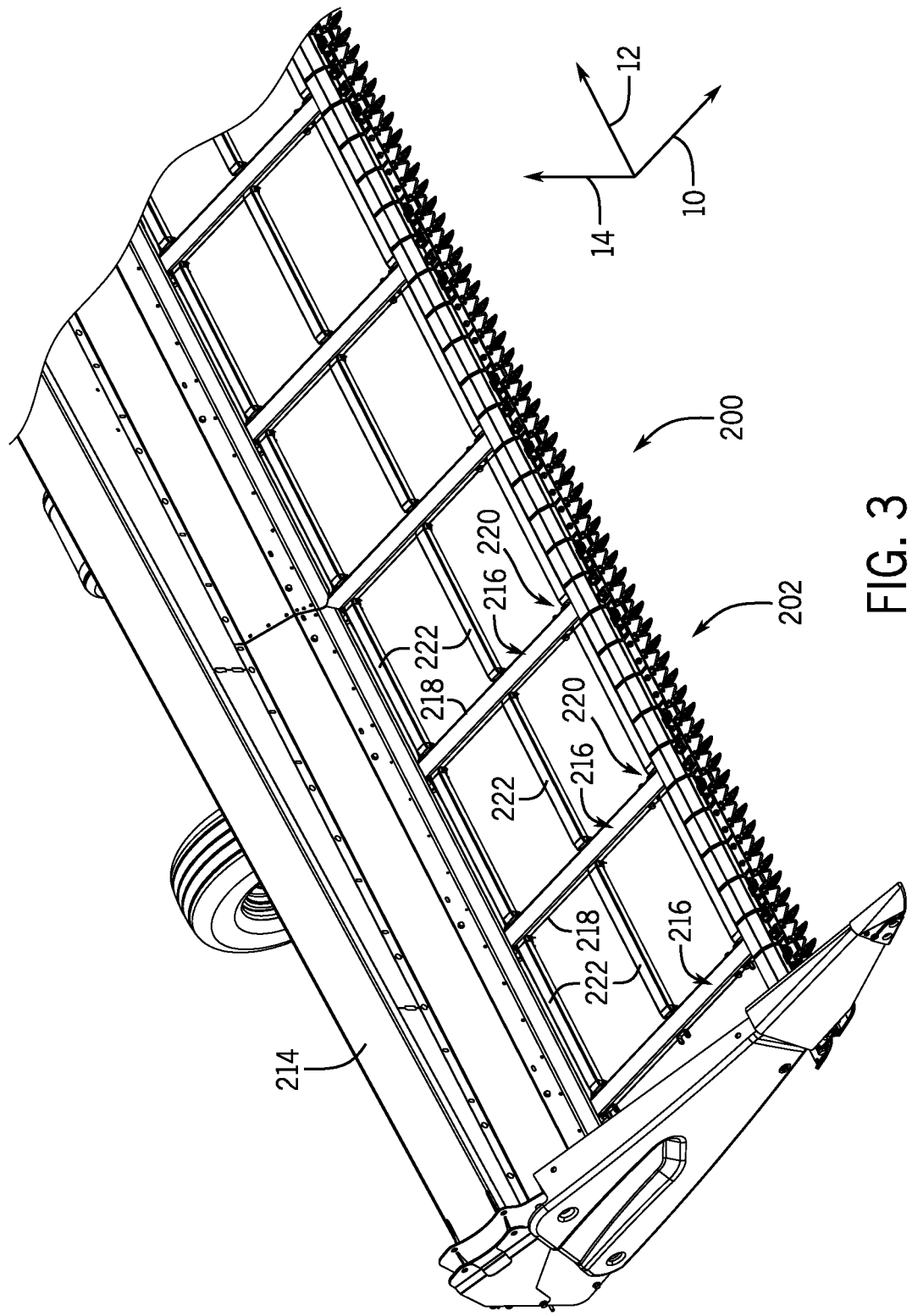
FIG. 3 is a perspective view of a portion of the header of FIG. 2, including a frame, a cutter bar assembly, and arm assemblies that support the cutter bar assembly, in accordance with an aspect of the present disclosure.

FIG. 3 is a perspective view of a portion of the header 200 of FIG. 2, including the cutter bar assembly 202 and arm assemblies 216 that support the cutter bar assembly 202. As illustrated, each arm assembly 216 extends substantially along the longitudinal axis 10. However, in alternative embodiments, each arm assembly may extend in any suitable direction. In the illustrated embodiment, the arm assemblies 216 are distributed along the width of the header 200 (e.g., the extent of the header along the lateral axis 12). The spacing between the arm assemblies 216 may be selected to enable the arm assemblies 216 to support the cutter bar assembly 202 and to enable the cutter bar assembly 202 to flex during operation of the header 200 (e.g., while the cutter bar assembly 202 is in the flexible configuration).

As discussed in detail below, each arm assembly 216 includes an arm 218 coupled to the cutter bar assembly 202 at a first end 220 (e.g., end portion) of the arm 218 and pivotally coupled to the frame 214 at a second end (e.g., end portion) of the arm 218 (e.g., a second end opposite the first end 220). The coupling between each arm 218 and the frame 214 is a respective pivot joint, and the pivot joint is configured to enable the respective arm assembly 216 to rotate relative to the frame 214 about a respective pivot axis. In the illustrated embodiment, lateral supports 222 extend between adjacent pairs of arms 218. A first end of each lateral support 222 is pivotally coupled to one arm 218, and a second end of each lateral support 222 is pivotally coupled to another arm 218. The lateral supports 222 are configured to support the respective lateral belt, while enabling the arm assemblies 216 to rotate about the respective pivot axes relative to the frame 214. While three lateral supports are positioned between each pair of arms in the illustrated embodiment, in other embodiments, more or fewer lateral supports may be positioned between at least one pair of arms (e.g., 1, 2, 3, 4, 5, 6). Furthermore, in certain embodiments, the lateral supports may be omitted between at least one pair of arms. In certain embodiments, some or all the lateral supports 222 and/or the arms 218 may include slots that enable the lateral supports 222 and the arms 218 to move relative to one another, such as generally along the longitudinal axis 10.

Figure 4:
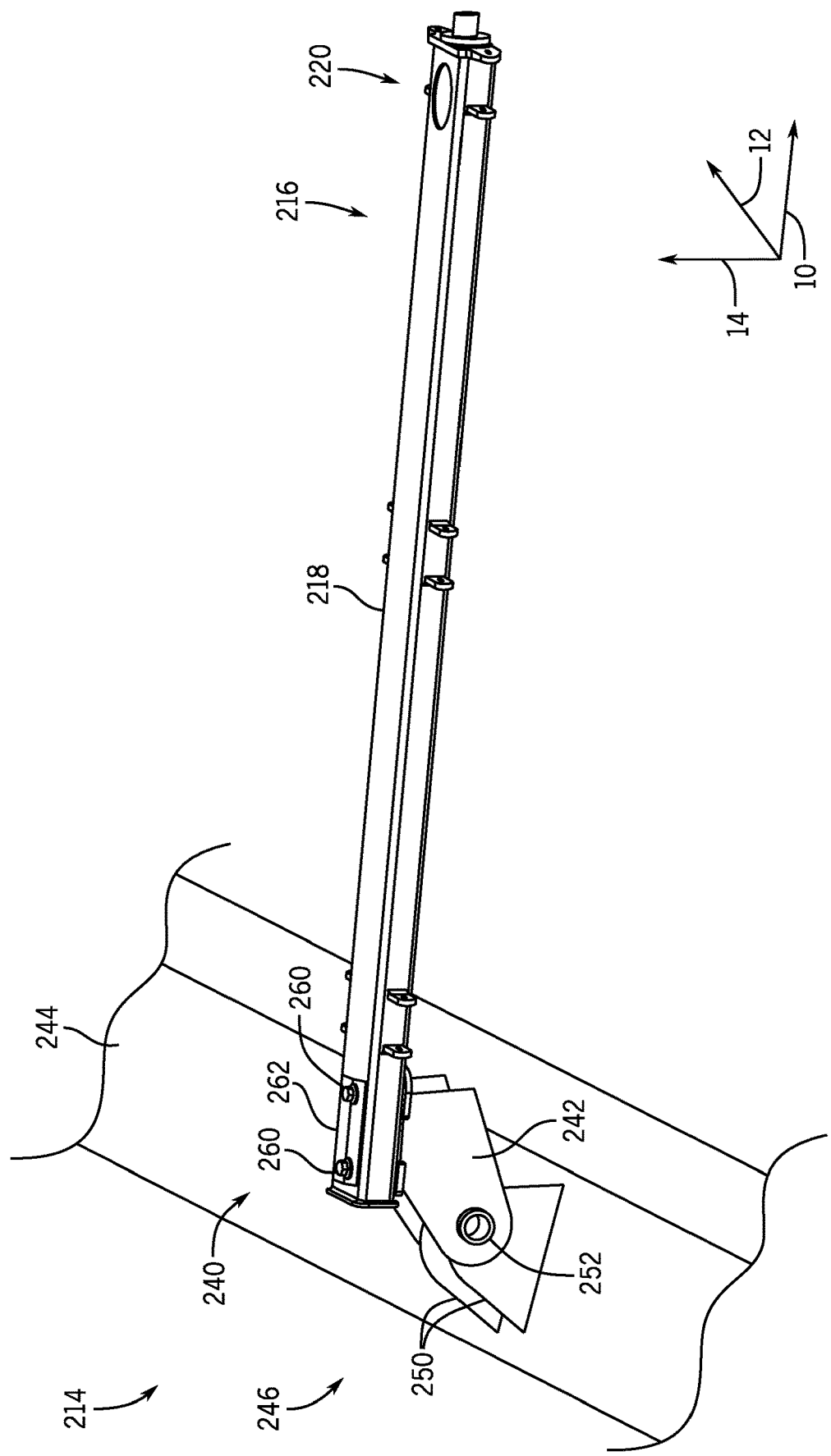
FIG. 4 is a perspective view of an embodiment of an arm assembly coupled to the frame of the agricultural header of FIG. 3, in accordance with an aspect of the present disclosure.

FIG. 4 is a perspective view of the arm assembly 216 of FIG. 3. As illustrated, the arm assembly 216 includes the arm 218 having the first end 220 and a second end 240 disposed generally opposite the first end 220 along the longitudinal axis 10. As discussed above, the first end 220 is configured to couple to the cutter bar assembly. As illustrated, the second end 240 is coupled to a mounting bracket assembly 242 of the arm assembly 216. The mounting bracket assembly 242 is pivotally coupled to a member 244 of the frame 214 at a pivot joint 246, such that the arm assembly 216 is configured to pivot about a pivot axis extending generally along the lateral axis 12. The pivot joint 246 includes the mounting bracket assembly 242, a bracket 250 of the frame 214 that extends from the member 244, and a pin 252 extending through the mounting bracket assembly 242 and the bracket 250. The pin 252 is configured to pivotally couple the mounting bracket assembly 242 to the bracket 250. For example, the pivot axis of the arm assembly 216 may extend generally through and/or along the pin 252. In certain embodiments, the mounting bracket assembly 242, and/or the arm assembly 216 generally, may be coupled to the frame 214 via other suitable coupling mechanisms.

The arm assembly 216 includes fasteners 260 that couple the arm 218 to the mounting bracket assembly 242. Additionally, the arm assembly 216 includes a plate 262 (e.g., a tension plate) disposed generally between heads of the fasteners 260 and a surface of the arm 218 (e.g., along the vertical axis 14). The plate 262 is configured to maintain a tension of the fasteners 260 with respect to the arm 218 and the mounting bracket assembly 242, thereby maintaining a substantially rigid coupling between the arm 218 and the mounting bracket assembly 242. For example, as generally described above, the second end 240 of the arm 218 coupled to the mounting bracket assembly 242 may be biased upwardly while the first end 220 of the arm 218 coupled to the cutter bar assembly is biased downwardly due to a weight of the cutter bar assembly, contact between the cutter bar assembly and a foreign obstacle, and/or agricultural product, dirt, and other materials being disposed on and adjacent to the cutter bar assembly. In certain embodiments, the arm assembly 216 and/or the header generally, may include a component that limits the travel and/or angle to the mounting bracket assembly 242. For example, a hydraulic cylinder may be coupled to the mounting bracket assembly 242 and the member 244 and may extend and retract as the arm 218 rotates relative to the member 244, thereby limiting travel of the mounting bracket assembly 242 and the arm assembly 216 generally. As the arm assembly 216 rotates relative to the frame 214, the second end 240 of the arm 218 coupled to the mounting bracket assembly 242 may be pulled upwardly away from the mounting bracket assembly 242, such that the fasteners 260 coupling the second end 240 of the arm 218 to the mounting bracket assembly 242 stretch. An operator of the header may be unaware of the stretched fasteners 260. Accordingly, the plate 262 disposed between the fasteners 260 and the arm 218 may maintain the tensioned coupling between the arm 218 and the mounting bracket assembly 242. As described in greater detail below, the plate 262 may maintain contact with both a surface of the arm 218 and heads of the fasteners 260 to maintain the substantially rigid coupling between the arm 218 and the mounting bracket assembly 242. Doing so enables the arm assembly 216 to remain substantially rigid without breaking (e.g., without the fasteners 260 breaking), thereby enabling the cutter bar assembly to flex. While two fasteners 260 are illustrated, it should be appreciated that the arm assembly 216 may include any number of fasteners 260 (e.g., 1, 2, 3, 4, or more).

Figure 5:
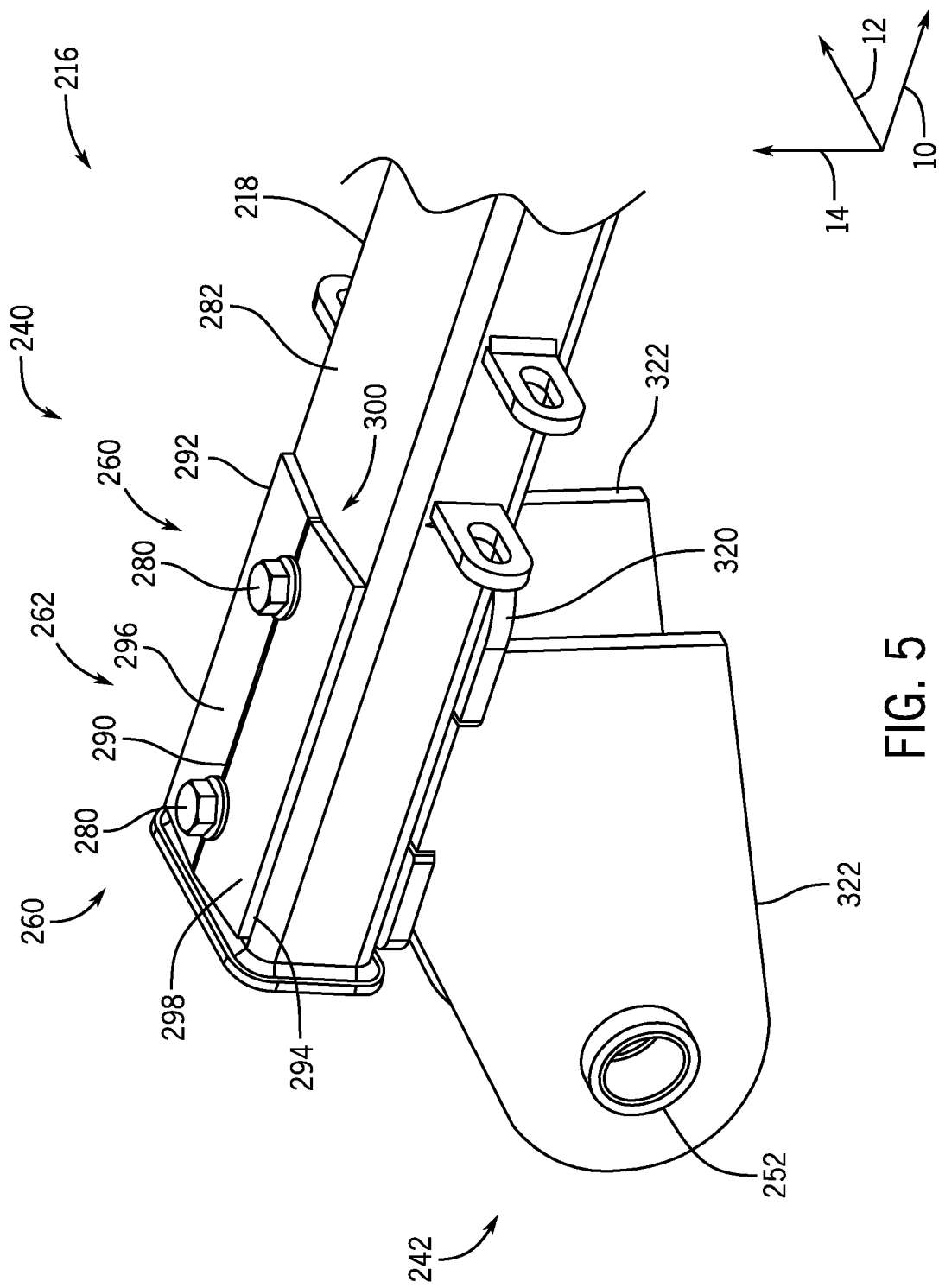
FIG. 5 is a perspective view of a portion of the arm assembly of FIG. 4, including an arm coupled to a mounting bracket assembly via fasteners and a plate disposed between the fasteners and the arm, in accordance with an aspect of the present disclosure.

FIG. 5 is a perspective view of a portion of the arm assembly 216 of FIG. 4, including the arm 218 coupled to the mounting bracket assembly 242 via the fasteners 260 and the plate 262 disposed between the fasteners 260 and the arm 218. More specifically, the plate 262 is disposed generally between a head 280 (e.g., radially-expanded portion; a bottom surface of the head 280) of each fastener 260 and a surface 282 (e.g., a top surface) of the arm 218. As illustrated, the plate 262 includes a middle portion 290 (e.g., central or intermediate portion) configured to maintain (e.g., substantially maintain) contact with the head 280 of each fastener 260, a first end portion 292 configured to maintain (e.g., substantially maintain) contact with the surface 282 of the arm 218, a second end portion 294 configured to maintain (e.g., substantially maintain) contact with the surface 282 of the arm 218, a first side portion 296 extending from the middle portion 290 to the first end portion 292, and a second side portion 298 extending from the middle portion 290 to the second end portion 294.

In the illustrated embodiment, the plate 262 is bent, such that there is a gap 300 (e.g., along the vertical axis 14) between the middle portion 290 and the surface 282. For example, the fasteners 260 may be in a stretched configuration in the illustrated embodiment, thereby enabling the plate 262 to bend (e.g., flex) and form or grow the gap 300. The fasteners 260 may initially be secured in a manner that the gap 300 is not present and/or is minimized (e.g., during initial installation of the plate 262 and/or during maintenance of the arm assembly 216), and the middle portion 290 may contact the surface 282. For example, the fasteners 260 may be torqued to pull the plate 262 flat against the surface 282 of the arm 218. A configuration of the plate 262 pulled flat against the surface 282 may correspond to a clamp force of the fasteners 260 of 100 percent. The clamp force of 100 percent indicates that the arm 218 is rigidly coupled to the mounting bracket assembly 242.

Over time and/or after use of the header, one or both fasteners 260 may stretch (e.g., stretch generally along the vertical axis 14) to enable the plate 262 to bend to form or grow the gap 300. The plate 262 may bend about a longitudinally-extending bend axis, which may intersect or be aligned with each fastener 260. In the illustrated embodiment with the gap 300, the first side portion 296 slopes generally vertically (e.g., downwardly) from the middle portion 290 to the first end portion 292, and the second side portion 298 slopes generally vertically (e.g., downwardly) from the middle portion 290 to the second end portion 294. As the fasteners 260 stretch, the plate 262 may bend to maintain a substantially rigid coupling between the arm 218 and the mounting bracket assembly 242 that corresponds to a clamp force of the fasteners 260 of 99.9, 99, 95, 90, 80, 70, 50, 30, or 10 percent, between 99.9 and 10 percent, between 90 and 20 percent, between 80 and 50 percent, and other suitable percentages and ranges of percentages.

As such, the plate 262 may remain in an elastic region while coupled to the arm 218 and the fasteners 260, thereby enabling the plate 262 to maintain the substantially rigid coupling of the arm 218 with the mounting bracket assembly 242. The plate 262 may include certain materials, may undergo certain processing steps (e.g., heat treatment), may be formed via certain manufacturing methods, and/or may include certain material properties enabling the plate 262 to remain in the elastic region. For example, the plate 262 may be single piece of formed metal (e.g., steel) or a single piece of formed plastic. In certain embodiments, the plate 262 may include metal (e.g., formed metal), plastic (e.g., formed plastic), a composite, wood, or a combination thereof. Prior to installation into the arm assembly 216, the plate 262 may be bent more than as illustrated in FIG. 5. For example, an angle between the first side portion 296 and the second side portion 298 may be less than as illustrated in FIG. 5 (e.g., less than or equal to approximately thirty degrees, sixty degrees, ninety degrees, one hundred twenty degrees).

In certain embodiments, only one or some of the fasteners 260 may stretch relative to other fasteners 260. If one fastener 260 stretches, while another fastener 260 does not stretch (or stretches less than the first, stretched fastener), the middle portion 290 of the plate 262 may maintain contact with the head 280 of both the stretched fastener 260 and the unstretched fastener 260. For example, the material, manufacturing process, and other attributes of the plate 262 may enable the plate 262 to flex generally along the longitudinal axis 10 while maintaining contact with both the head 280 of the stretched fastener 260 and the unstretched fastener 260. The gap 300 at a first portion of the plate 262 at/adjacent to the stretched fastener 260 may be greater than the gap 300 at a second portion of the plate 262 at/adjacent to the unstretched fastener 260. In certain embodiments, only the rear-most fastener 260 may stretch (e.g., the fastener 260 farther from the cutter bar assembly), and/or the rear-most fastener 260 may stretch more relative to the forward-most fastener 260 (e.g., the fastener 260 closer to the cutter bar assembly). In some embodiments, only the forward-most fastener 260 may stretch, and/or the forward-most fastener 260 may stretch more relative to the rear-most fastener 260. In each such embodiment, the plate 262 may substantially maintain contact with both fasteners 260 and the arm 218.

The plate 262 may be configured to distribute a load of the fasteners 260 over the arm 218, such that the load is not concentrated on portions of the arm 218 directly adjacent to the fasteners 260. For example, without the plate 262, a load of the fasteners 260 on the arm 218 may be concentrated to portions of the arm 218 in contact with the heads 280 of the fasteners 260. The plate 262 may contact the heads 280 and distribute the loads associated with the heads 280, and the fasteners 260 generally, over a larger surface area of the arm 218.

The mounting bracket assembly 242 includes a top bracket 320 and side brackets 322 coupled to the top bracket 320. In certain embodiments, the side brackets 322 may be welded to the top bracket 320. In some embodiments, the mounting bracket assembly 242 may be a single piece of metal or a single piece of plastic that is formed to provide the top bracket 320 and the side brackets 322. The pin 252 extends through the side brackets 322. Additionally, as described in greater detail below, the fasteners 260 are configured to extend through the top bracket 320 to secure the arm 218 to the mounting bracket assembly 242.

In certain embodiments, the plate 262, or a portion thereof, may be replaced by a beveled (e.g., conical) washer that circumferentially surrounds the fastener 260. For example, the arm assembly 216 may include the plate 262 disposed between one fastener 260 and the surface 282 and the beveled washer disposed between the other fastener 260 and the surface 282. In some embodiments, the arm assembly 216 may include beveled washers disposed between each fastener 260 and the surface 282 (e.g., the plate 262 may be omitted). A middle portion of the beveled washer may be configured to remain in contact with the head 280 of the fastener 260, and an outer portion (e.g., radially-outer portion) of the beveled washer may be configured to remain in contact with the surface 282, thereby maintaining the substantially rigid coupling between the arm 218 and the mounting bracket assembly 242 while/after the fastener 260 stretches.

In some embodiments, the plate 262 may be split into two plates 262 (e.g., two pieces) generally along the lateral axis 12, such that a first plate 262 is disposed between a first fastener 260 and the arm 218 and a second plate 262 is disposed between a second fastener 260 and the arm 218. In such embodiments, each plate 262 may include a respective middle portion 290, a respective first end portion 292, a respective second end portion 294, a respective first side portion 296, and a respective second side portion 298.

Figure 6:
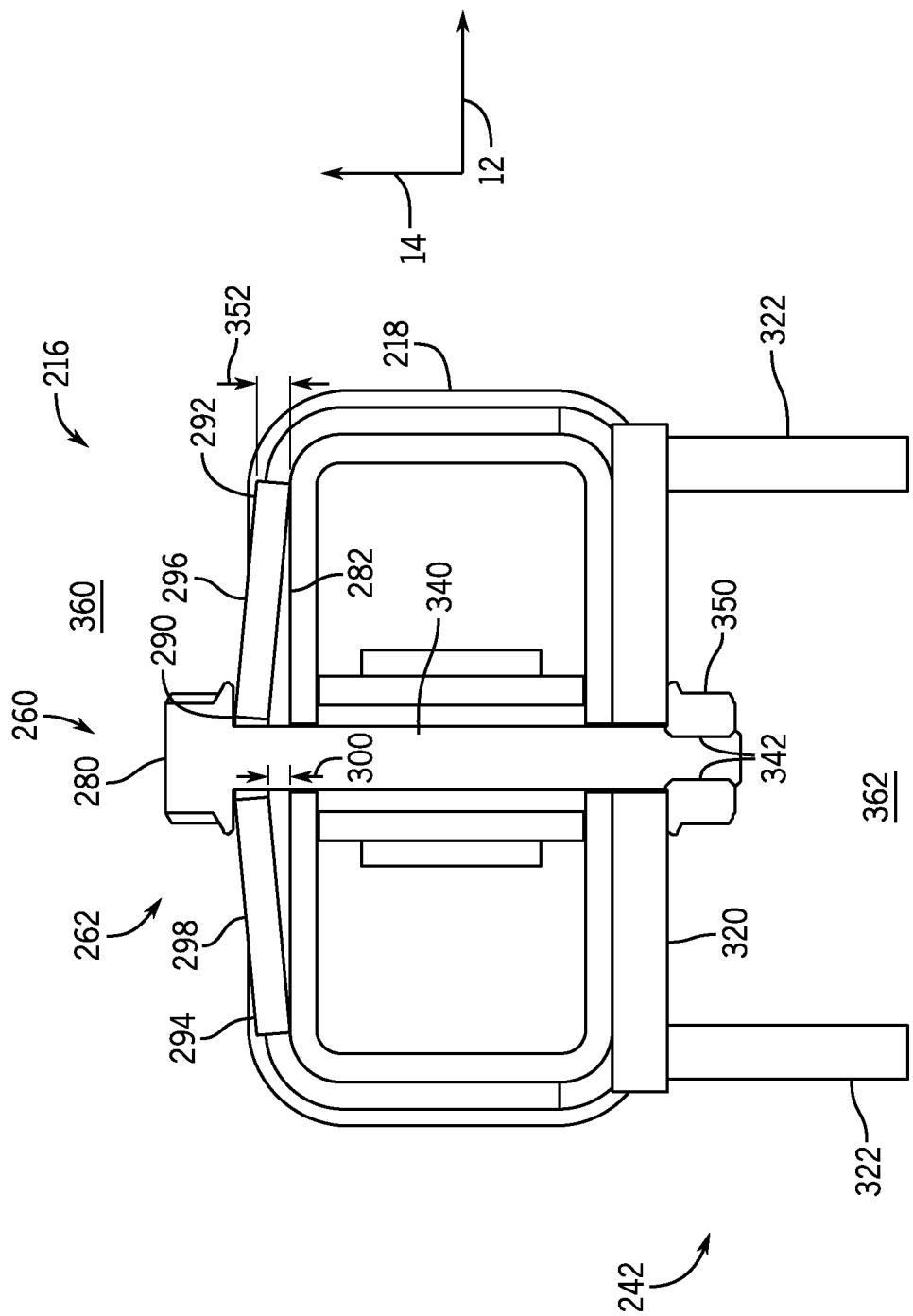
FIG. 6 is a front cross-sectional view of the arm assembly of FIG. 5, in accordance with an aspect of the present disclosure.

FIG. 6 is a front cross-sectional view of the arm assembly 216 of FIG. 5. As illustrated, the fastener 260 includes the head 280 and a body 340 extending from the head 280, through the plate 262, through the surface 282 of the arm 218, and through the top bracket 320 of the mounting bracket assembly 242. The body 340 includes threads 342 that engage a nut 350. As described above, the fastener 260 (e.g., a bolt) may be engaged with the nut 350 and torqued such that the gap 300 is not present and/or is minimized. Over time and/or after use of the header, the body 340 and/or other portion(s) of fastener 260 may stretch to enable the plate 262 to bend to form or grow the gap 300. The threads 342 of the fastener 260 may remain engaged with the nut 350 while/after the fastener 260 stretches. Additionally, the middle portion 290 of the plate 262 may remain engaged with the head 280 of the fastener, thereby maintaining the substantially rigid coupling between the arm 218 and the mounting bracket assembly 242. A thickness 352 of the plate 262 may be 1 millimeter ("mm"), 2 mm, 3 mm, 4 mm, 5 mm, 6 mm, 8 mm, 10 mm, 15 mm, 20 mm, 50 mm, between 1 mm and 10 mm, between 2 mm and 5 mm, and other suitable thicknesses or ranges of thicknesses. The thickness 352 of the plate 362 may be uniform across the plate 362 (e.g., the thickness 352 of the first side portion 294 and the second side portion 296 may be uniform), or the thickness 352 may vary across the plate 362.

As illustrated, the plate 262 is disposed on a first side 360 (e.g., a top side) of the arm 218, and the nut 350 is disposed on a second side 362 (e.g., a bottom side) of the arm 218. In certain embodiments, the plate 262 may be disposed on the second side 362 of the arm 218. For example, the plate 262 may be disposed between the nut 350 and the top bracket 320 of the mounting bracket assembly 242 (e.g., along the vertical axis 14). In such embodiments, the head 280 of the fastener 260 may contact the surface 282 of the arm 218.

In some embodiments, the fastener 260 may be flipped relative to the lateral axis 12, such that the head 280 is disposed on the second side 362, and the threads 342 are disposed on the first side 360. In such embodiments, the plate 262 may be disposed on the second side 362 between the head 280 and the top bracket 320, or the plate 262 may be disposed on the first side 360 between the nut 350 and the surface 282 of the arm 218. In certain embodiments, the arm assembly 216 may include one plate 262 on the first side 360 and one plate 262 on the second side 362.

Figure 7:
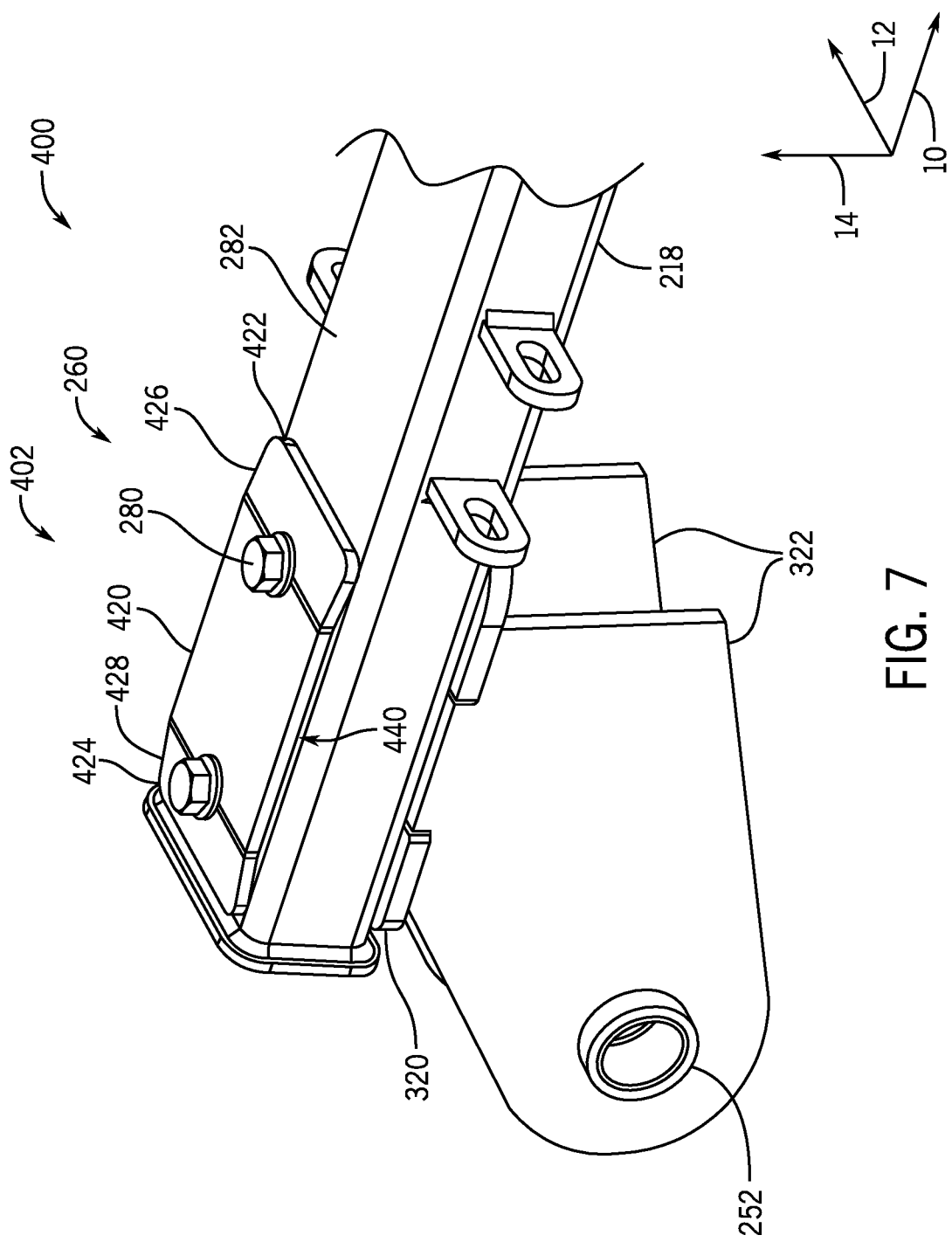
FIG. 7 is a perspective view of another embodiment of a portion of an arm assembly configured to couple to the frame of the agricultural header of FIG. 3, in accordance with an aspect of the present disclosure.

FIG. 7 is a perspective view of another embodiment of a portion of an arm assembly 400 configured to couple to the frame 214 of the header of FIG. 3. As illustrated, the arm assembly 400 includes the arm 218, the mounting bracket assembly 242, the fasteners 260 coupling the arm 218 and the mounting bracket assembly 242, and a plate 402 disposed generally between the head 280 of each fastener 260 and the surface 282 of the arm 218. As illustrated, the plate 402 includes a connecting portion 420 (e.g., middle portion) configured to maintain (e.g., substantially maintain) contact with the head 280 of each fastener 260, a first end portion 422 configured to maintain (e.g., substantially maintain) contact with the surface 282 of the arm 218, a second end portion 424 configured to maintain (e.g., substantially maintain) contact with the surface 282 of the arm 218, a first side portion 426 extending from the connecting portion 420 to the first end portion 422, and a second side portion 428 extending from the connecting portion 420 to the second end portion 424.

In the illustrated embodiment, the plate 402 is bent, such that there is a gap 440 (e.g., along the vertical axis 14) between the connecting portion 420 and the surface 282. For example, the fasteners 260 may be in a stretched configuration in the illustrated embodiment, thereby enabling the plate 402 to bend (e.g., flex) and form or grow the gap 440. The fasteners 260 may initially be secured in a manner that the gap 440 is not present and/or is minimized (e.g., during initial installation of the plate 402 and/or during maintenance of the arm assembly 400), and the connecting portion 420 may contact the surface 282. For example, the fasteners 260 may be torqued to pull the plate 402 flat against the surface 282 of the arm 218. A configuration of the plate 402 pulled flat against the surface 282 may correspond to a clamp force of the fasteners 260 of 100 percent. The clamp force of 100 percent indicates that the arm 218 is rigidly coupled to the mounting bracket assembly 242.

Over time and/or after use of the header, one or both fasteners 260 may stretch (e.g., stretch generally along the vertical axis 14) to cause the plate 402 to bend to form or grow the gap 440. The plate 402 may bend about a laterally-extending bend axis, which may intersect or be aligned with each fastener 260. In the illustrated embodiment with the gap 440, the first side portion 426 slopes generally vertically (e.g., downwardly) from the connecting portion 290 to the first end portion 422, and the second side portion 428 slopes generally vertically (e.g., downwardly) from the connecting portion 420 to the second end portion 424. As the fasteners 260 stretch, the plate 402 may maintain a substantially rigid coupling between the arm 218 and the mounting bracket assembly 242 that corresponds to a clamp force of the fasteners 260 of 99.9, 99, 95, 90, 80, 70, 50, 30, or 10 percent, between 99.9 and 10 percent, between 90 and 20 percent, between 80 and 50 percent, and other suitable percentages and ranges of percentages.

As such, the plate 402 may remain in an elastic region while coupled to the arm 218 and the fasteners 260, thereby enabling the plate 402 to maintain the substantially rigid coupling of the arm 218 with the mounting bracket assembly 242. The plate 402 may include certain materials, may undergo certain processing steps (e.g., heat treatment), may be formed via certain manufacturing methods, and/or may include certain material properties enabling the plate 402 to remain in the elastic region. For example, the plate 402 may be single piece of formed metal (e.g., steel) or a single piece of formed plastic. In certain embodiments, the plate 402 may include metal (e.g., formed metal), plastic (e.g., formed plastic), a composite, wood, or a combination thereof. Prior to installation into the arm assembly 400, the plate 402 may be bent more than as illustrated in FIG. 7. For example, an angle between the first side portion 426 and the connecting portion 420 and/or between the second side portion 428 and the connecting portion 420 may be less than as illustrated in FIG. 7 (e.g., less than or equal to approximately thirty degrees, sixty degrees, ninety degrees, one hundred twenty degrees).

In certain embodiments, the plate 402, or a portion thereof, may be replaced by the beveled washer described above. For example, the arm assembly 400 may include the plate 402 disposed between one fastener 260 and the surface 282 and the beveled washer disposed between the other fastener 260 and the surface 282. In some embodiments, the arm assembly 400 may include beveled washers disposed between each fastener 260 and the surface 282 (e.g., the plate 402 may be omitted).

In some embodiments, the connecting portion 420 of the plate 402 may also contact the surface 282 of the arm 218. For example, end sections of the connecting portion 420 may contact the heads 280 of the fasteners 280, and a middle section of the connecting portion 420 (e.g., a section between the end sections) may contact the surface 282 of the arm 218. In such embodiments, the plate 402 may be an "M" shape when a gap is present between the end sections of the connecting portion 420 and the surface 282 of the arm 218.

Figure 8:
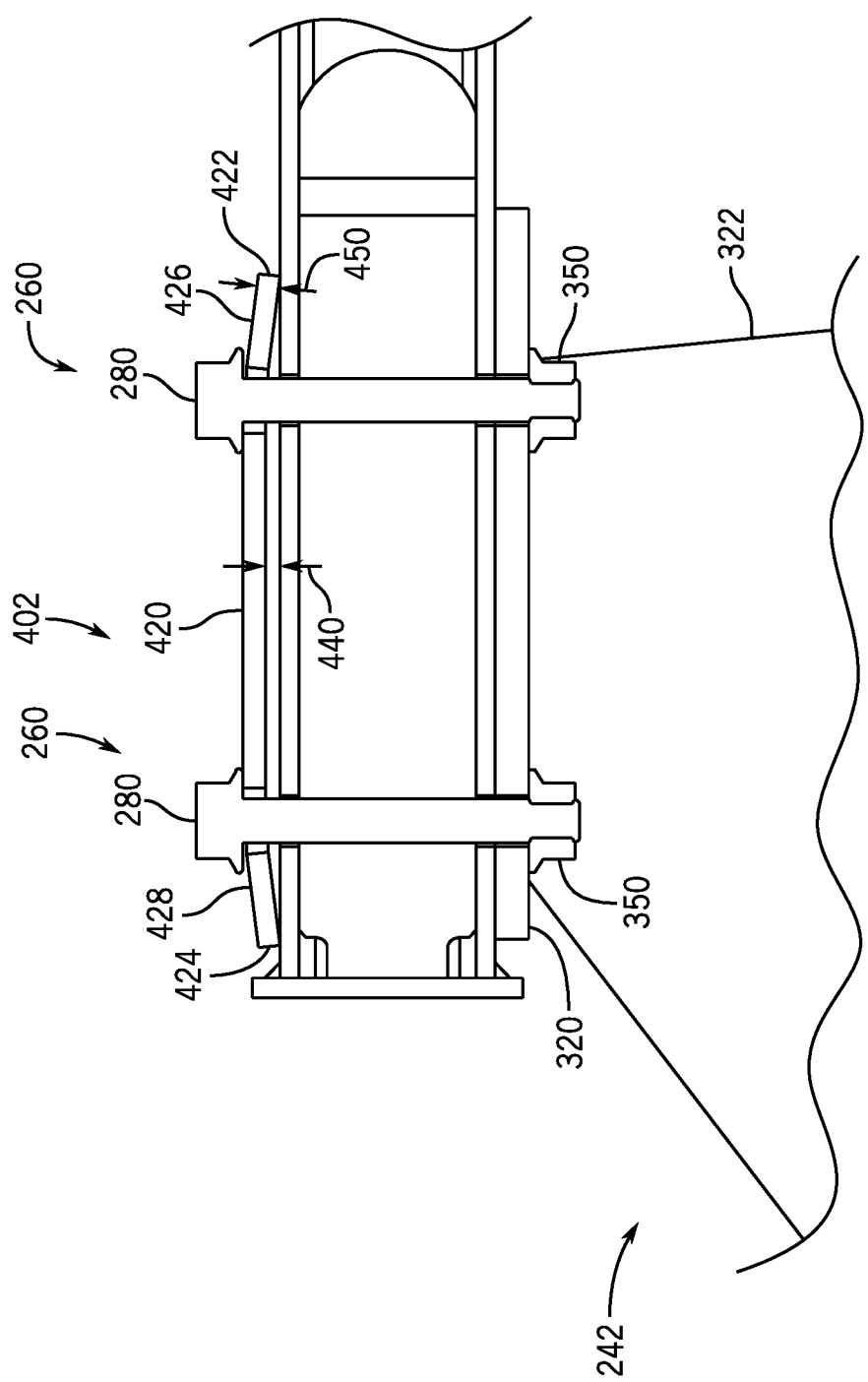
FIG. 8 is a side cross-sectional view of the arm assembly of FIG. 7, in accordance with an aspect of the present disclosure.

FIG. 8 is a side cross-sectional view of the arm assembly 400 of FIG. 7. As illustrated, each fastener 260 includes the head 280 and the body 340 extending from the head 280, through the plate 402, through the surface 282 of the arm 218, and through the top bracket 320 of the mounting bracket assembly 242. Each fastener 260 may be engaged with a respective nut 350 and torqued such that the gap 440 is not present and/or is minimized. Over time and/or after use of the header, the bodies 340 and/or other portion(s) of the fasteners 260 may stretch to form or grow the gap 440. The threads 342 of each fastener 260 may remain engaged with the respective nut 350 while/after the fasteners 260 stretch. Additionally, the connecting portion 420 of the plate 402 may remain engaged with the head 280 of the fastener, thereby maintaining the substantially rigid coupling between the arm 218 and the mounting bracket assembly 242. A thickness 450 of the plate 402 may be 1 millimeter ("mm"), 2 mm, 3 mm, 4 mm, 5 mm, 6 mm, 8 mm, 10 mm, 15 mm, 20 mm, 50 mm, between 1 mm and 10 mm, between 2 mm and 5 mm, and other suitable thicknesses or ranges of thicknesses. The thickness 450 of the plate 402 may be uniform or may vary across the plate 402.

As illustrated, the plate 402 is disposed on the first side 360 of the arm 218, and the nuts 350 are disposed on the second side 362 of the arm 218. In certain embodiments, the plate 402 may be disposed on the second side 362 and generally between the nuts 350 and the top bracket 320 of the mounting bracket assembly 242 (e.g., along the vertical axis 14). In such embodiments, the head 280 of each fastener 260 may contact the surface 282 of the arm 218.

In some embodiments, the fasteners 260 may be flipped relative to the lateral axis 12, such that the heads 280 are disposed on the second side 362, and the threads 342 are disposed on the first side 360. In such embodiments, the plate 402 may be disposed on the second side 362 between the heads 280 and the top bracket 320, or the plate 402 may be disposed on the first side 360 between the nuts 350 and the surface 282 of the arm 218. In certain embodiments, the arm assembly 216 may include the plate 402 on both the first side 360 and the second side 362.

In certain embodiments, only one or some of the fasteners 260 may stretch relative to other fasteners 260. If one fastener 260 stretches, while another fastener 260 does not stretch (or stretches less than the first, stretched fastener), the connecting portion 420 of the plate 402 may maintain contact with the head 280 of both the stretched fastener 260 and the unstretched fastener 260. For example, the material, manufacturing process, and other attributes of the plate 402 may enable the plate 402 to flex generally along the longitudinal axis 10 while maintaining contact with both the head 280 of the stretched fastener 260 and the unstretched fastener 260. The gap 440 at a first portion of the plate 402 at/adjacent to the stretched fastener 260 may be greater than the gap 440 at a second portion of the plate 402 at/adjacent to the unstretched fastener 260. In certain embodiments, only the rear-most fastener 260 may stretch (e.g., the fastener 260 farther from the cutter bar assembly), and/or the rear-most fastener 260 may stretch more relative to the forward-most fastener 260 (e.g., the fastener 260 closer to the cutter bar assembly). In some embodiments, only the forward-most fastener 260 may stretch, and/or the forward-most fastener 260 may stretch more relative to the rear-most fastener 260. In each such embodiment, the plate 402 may substantially maintain contact with both fasteners 260 and the arm 218.

The plate 402 may be configured to distribute a load of the fasteners 260 over the arm 218, such that the load is not concentrated on portions of the arm 218 directly adjacent to the fasteners 260. For example, without the plate 402, a load of the fasteners 260 on the arm 218 may be concentrated to portions of the arm 218 in contact with the heads 280 of the fasteners 260. The plate 402 may contact the heads 280 and distribute the loads associated with the heads 280, and the fasteners 260 generally, over a larger surface area of the arm 218.

In some embodiments, the connecting portion 420 of the plate 402 may include a bend extending generally along the lateral axis 12 and configured to be disposed generally between the fasteners 260 of the arm assembly 400. The bend may be disposed farther or closer to the surface 282 relative to other portions of the connecting portion 420 (e.g., relative to portions of the connecting portion 420 configured to contact the heads 280 of the fasteners 260). The bend may facilitate isolating stretching of only one or some of the fasteners 260 relative to other fasteners 260. For example, if one fastener 260 stretches, while another fastener 260 does not stretch, the bend may facilitate the connecting portion 420 maintaining contact with the head 280 of both the stretched fastener 260 and the unstretched fastener 260.

Accordingly, an arm assembly of a header for an agricultural harvester may include an arm configured to couple to a cutter bar assembly of the header, a mounting bracket assembly coupled to the arm and to a frame of the header, fasteners that couple the arm to the mounting bracket assembly, and a plate (e.g., a tension plate) disposed generally between the fasteners and the arm. The plate may maintain a tensioned coupling between the arm and the mounting bracket assembly. For example, during operation and/or use of the header, the fasteners may stretch without breaking, such as due to forces on the arm assembly (e.g., due to dirt and/or other debris on the header, due to contact with foreign objects such as a fence, and due to other factors). The plate may maintain contact with both a surface of the arm and heads of the fasteners while/after the fasteners have stretched, thereby maintaining a substantially rigid coupling between the arm and the mounting bracket assembly. The plate maintaining the substantially rigid coupling between the arm and the mounting bracket assembly enables the arm assembly to remain substantially rigid as the arm assembly rotates relative to the frame, thereby enabling the cutter bar assembly coupled to the arm assembly to flex.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An arm assembly for an agricultural header, comprising:
   an arm configured to rotate about a pivot axis relative to a frame of the agricultural header, wherein the arm is configured to support a cutter bar assembly of the agricultural header;
   a mounting bracket assembly configured to couple the arm to the frame;
   one or more fasteners configured to couple the arm to the mounting bracket assembly; and
   a plate configured to maintain a tension of the one or more fasteners with respect to the arm and the mounting bracket assembly, wherein the plate comprises a middle portion, a first end portion, a second end portion disposed opposite the first end portion, a first side portion extending from the middle portion to the first end portion, and a second side portion extending from the middle portion to the second end portion, wherein the first side portion and the second side portion are configured to slope vertically while the one or more fasteners are in a stretched configuration.

2. The arm assembly of claim 1, wherein the arm comprises:
   a first end coupled to the cutter bar assembly; and
   a second end coupled to the mounting bracket assembly, wherein the second end is opposite the first end.

3. The arm assembly of claim 1, wherein the one or more fasteners comprise a plurality of fasteners disposed longitudinally along the arm.

4. The arm assembly of claim 1, wherein each fastener of the one or more fasteners comprises a head and a body extending from the head, the head is disposed apart from a surface of the arm and outside the arm, and the body extends into the arm.

5. The arm assembly of claim 4, wherein the plate is disposed between the surface of the arm and the head of each fastener of the one or more fasteners.

6. The arm assembly of claim 5, wherein the plate is configured to flex to maintain the tension of the one or more fasteners with respect to the arm and the mounting bracket assembly.

7. The arm assembly of claim 1, wherein the middle portion is configured to maintain contact with the head of each fastener of the one or more fasteners while the one or more fasteners are in the stretched configuration, and the first end portion and the second end portion are configured to maintain contact with the arm while the one or more fasteners are in the stretched configuration.

8. The arm assembly of claim 1, wherein the plate comprises formed metal, formed plastic, a composite, wood, or a combination thereof.

9. The arm assembly of claim 1, wherein the mounting bracket assembly is rigidly coupled to the arm via the one or more fasteners.

10. The arm assembly of claim 1, comprising a pin coupled to the frame of the agricultural header, wherein the mounting bracket assembly comprises a top bracket coupled to the arm via the one or more fasteners and side brackets coupled to the top bracket and to the pin, and wherein the pivot axis extends along the pin.

11. An agricultural header, comprising:
    a frame;
    an arm configured to rotate about a pivot axis relative to the frame;
    one or more fasteners configured to couple the arm to the frame; and
    a plate configured to flex to maintain a tension of the one or more fasteners with respect to the arm and the frame, wherein the plate comprises a middle portion, a first end portion, a second end portion disposed opposite the first end portion, a first side portion extending from the middle portion to the first end portion, and a second side portion extending from the middle portion to the second end portion, wherein the first side portion and the second side portion are configured to extend longitudinally along the arm, the middle portion is configured to maintain contact with each fastener of the one or more fasteners, and the first end portion and the second end portion are configured to maintain contact with the arm.

12. The agricultural header of claim 11, comprising a mounting bracket assembly configured to couple the arm to the frame, wherein the one or more fasteners are configured to couple the arm to the mounting bracket assembly.

13. The agricultural header of claim 11, wherein the first side portion and the second side portion are configured to extend laterally along the arm.

14. An arm assembly for an agricultural header, comprising:
    an arm configured to rotate about a pivot axis relative to a frame of the agricultural header, wherein the arm is configured to support a cutter bar assembly of the agricultural header;
    one or more fasteners configured to couple the arm to a mounting bracket assembly of the agricultural header wherein each fastener of the one or more fasteners comprises a head and a body extending from the head, the head is disposed apart from a surface of the arm and outside the arm, and the body extends into the arm; and a plate configured to maintain a tension of the one or more fasteners with respect to the arm and the mounting bracket assembly, wherein the plate comprises a middle portion, a first end portion, a second end portion disposed opposite the first end portion, a first side portion extending from the middle portion to the first portion, and a second portion extending from the middle portion to the second end portion, wherein the first side portion and the second side portion are configured to extend longitudinally along the arm, the middle portion is configured to maintain contact with the head of each fastener of the one or more fasteners, and the first end portion and the second end portion are configured to maintain contact with the surface of the arm.

15. The agricultural header of claim 14, wherein wherein the first side portion and the second side portion are configured to extend laterally along the arm.

16. The agricultural header of claim 14, wherein the plate comprises a single piece of formed metal or formed plastic.

\* \* \* \* \*